(12) United States Patent
Snowdon

(10) Patent No.: US 7,597,506 B2
(45) Date of Patent: Oct. 6, 2009

(54) CONTAINER AND METHOD FOR THE TRANSPORT AND PNEUMATIC CONVEYING OF BULK POWDERS

(75) Inventor: Brian Snowdon, Doncaster (GB)

(73) Assignee: Inbulk Technologies Limited (GB)

( * ) Notice: Subject to any disclaimer, the term of this patent is extended or adjusted under 35 U.S.C. 154(b) by 386 days.

(21) Appl. No.: 10/538,906

(22) PCT Filed: Dec. 16, 2003

(86) PCT No.: PCT/GB03/05495

§ 371 (c)(1),
(2), (4) Date: Jan. 11, 2006

(87) PCT Pub. No.: WO2004/054899

PCT Pub. Date: Jul. 1, 2004

(65) Prior Publication Data

US 2006/0255046 A1 Nov. 16, 2006

(30) Foreign Application Priority Data

Dec. 16, 2002 (GB) ................... 0229252.2

(51) Int. Cl.
*B60P 1/60* (2006.01)
*B65G 53/38* (2006.01)

(52) U.S. Cl. ............... 406/39; 406/122; 406/138

(58) Field of Classification Search ........... 406/39, 406/90, 86, 43, 138, 91, 120, 146; 222/195, 222/630, 637

See application file for complete search history.

(56) References Cited

U.S. PATENT DOCUMENTS

| 2,694,496 A | * | 11/1954 | Atkinson | 406/65 |
| 2,708,602 A | * | 5/1955 | Galle | 406/90 |
| 2,735,725 A | * | 2/1956 | Galle | 406/90 |
| 3,212,824 A | * | 10/1965 | Emery et al. | 406/90 |
| 3,232,673 A | * | 2/1966 | Selig et al. | 406/89 |
| 3,519,310 A | | 7/1970 | Holm et al. | |
| 3,937,521 A | * | 2/1976 | Reuter | 406/25 |
| 4,172,618 A | * | 10/1979 | Lambert | 406/90 |
| 4,353,668 A | * | 10/1982 | Anderson | 406/90 |
| 4,371,295 A | * | 2/1983 | Hart | 406/128 |
| 4,823,989 A | * | 4/1989 | Nilsson | 222/630 |
| 5,547,331 A | * | 8/1996 | Podd et al. | 414/808 |
| 5,647,514 A | * | 7/1997 | Toth et al. | 222/181.3 |
| 5,960,974 A | * | 10/1999 | Kee et al. | 220/1.5 |
| 6,666,628 B1 | * | 12/2003 | Tilley | 406/146 |
| 2002/0134786 A1 | * | 9/2002 | Hinkle et al. | 220/565 |

FOREIGN PATENT DOCUMENTS

| CH | 515 158 | 11/1971 |
| EP | 0 040 644 | 12/1981 |
| EP | 0 453 339 | 10/1991 |
| GB | 753 190 | 7/1956 |
| GB | 1 575 203 | 9/1980 |
| NL | 114 103 | 7/1969 |

* cited by examiner

*Primary Examiner*—Gene Crawford
*Assistant Examiner*—William R Harp
(74) *Attorney, Agent, or Firm*—Salter & Michaelson

(57) ABSTRACT

An elongate container (7) for the transport of bulk powders is provided along its base with a longitudinally sloping membrane support. A gas permeable membrane (11) is mounted on the support and the support is itself unsupported relative to the container between its longitudinal and transverse ends. A method of conveying bulk powder using such a container is also described.

18 Claims, 6 Drawing Sheets

CONTAINER AND METHOD FOR THE TRANSPORT AND PNEUMATIC CONVEYING OF BULK POWDERS

FIELD OF THE INVENTION

This invention relates to the transport and pneumatic conveying of bulk materials, in particular to containers therefor and methods thereof. More particularly the invention is concerned with the transport and unloading of bulk powders in standard ISO container-dimensioned tanks.

BACKGROUND TO THE INVENTION

Currently, large quantities of liquids are transported in horizontal cylindrical tanks which are located within a frame which has the dimensions of standard ISO containers, so that, as a result, they can be transported and handled by standard container handling and transport systems. They may be transported by rail, road and sea and emptied by connecting a hose to a discharge pipe located at the bottom of the tank.

Bulk powders can also be transported in this type of tank, but, being bulk powders, they cannot be emptied in the same way. One method of emptying involves tipping the tank to an approximately 45° angle and then pressurising the tank to discharge the contents from one end through a hose. An alternative method involves a fluidising system covering a large proportion of the internal area of the base of the tank. Along the length of the tank there are arranged a plurality of discharge points through which the material is pneumatically conveyed after pressurisation of the tank. With such an arrangement the tank can be emptied while it remains horizontal.

An alternative method of fluidising the tank involves the provision of a plurality of conical outlets in a line along the length of the bottom half of the tank. The material can flow into these outlets by gravity and thence be pneumatically conveyed to storage. Flow is by gravity towards the outlets with only the bottom of the conical section being aerated. The provision of the conical outlets reduces the total storage space. Furthermore the overall shape, including the conical outlets is not ideal for a pressure vessel.

The use of an internal fluidising membrane, which covers a large proportion of the base area of the tank, enables the maximum bulk powder volume to be transported. Due to the conventional methods of internal membrane support structure which have been employed, this method results in a considerable increase in the weight of the overall container. The amount of bulk material which can be transported is limited by the maximum transportable weight of the container together with its contents, typically between 30 and 34 tonnes. It is therefore desirable to utilise a fluidisation system which leaves maximum internal volume for bulk material and also adds as little as possible to the weight of the container.

To enable the fluidised material to flow by gravity towards the discharge pipes, the fluidising membrane is sloped at an angle to the horizontal which is typically between 5 and 10°. Previous methods for supporting the fluidising membrane include the use of internal frames onto which flat panels of fluidising membrane are bolted. These frames cause a reduction in volume due to their height inside the tank. They are usually constructed in flat panel format which creates a number of areas on the membrane which do not fluidise well at the junctions between the panels when fixing bolts are present. This results in a number of places where the material does not flow, thereby resulting in relatively large amounts of residual materials in the tank which cannot be discharged. Furthermore, the flat panels require significant reinforcement to take the weight of bulk powder such as cement over such a large flat area. This reinforcement is expensive and adds weight to the tank which affects the economics of its use due to the overall transport weight restrictions for such containers.

STATEMENTS OF THE INVENTION

According to the present invention there is provided an elongate container for the transport of bulk powders, the bottom of the container being provided with a longitudinally sloping membrane support extending along at least a portion of the length of the container, a gas-permeable membrane mounted on said support, said support being unsupported relative to the container between its longitudinal and transverse ends.

Preferably the membrane is curved in a direction transverse to the length of the container, the extent of curvature changing along the length of the membrane.

The changing curvature along the length of the membrane creates a slope for gravity flow of the fluidised powder towards a discharge point.

Preferably the curvature of the membrane increases in a direction from its lowest point to its highest point.

Preferably a plurality of membranes are arranged along the base of the container in lengthwise juxtaposition. More preferably adjacent membranes slope in opposite directions along the length of the container. Preferably the container, when arranged for unloading of its bulk powder content, is provided with a discharge pipe, one end of which is located adjacent the lowest point of the or each membrane. More preferably the discharge pipe is connected to means, located outside the container for pneumatically conveying powder from the container to a position exterior thereof.

Preferably means are provided, when the container is to be unloaded, to cause powder located above the membrane to be fluidised. More preferably the fluidising means include means for delivering gas under pressure to the space below the sloping membrane.

Preferably the membrane is supported on a foraminous curved plate. The membrane is preferably made from a porous material permitting gas to flow through it but being impervious to the bulk powder material. The membrane may be made of, for instance, woven fabric, porous metal sheet or porous plastic sheet.

The elongate container of the present invention may be cylindrical, which is a preferred shape for a pressure vessel. Preferably the container is a pressure vessel located within a standard ISO Tank Container dimensioned frame.

The present invention also provides a method of conveying bulk powder to a destination therefor including the steps of:
  loading the bulk powder into a container as claimed in any of the previous claims;
  transporting the container to a location in the vicinity of said destination;
  feeding gas under pressure to a position between the membrane and the bottom of the container so as to fluidise the bulk powder within the container; and
  pneumatically conveying said fluidised bulk powder from the container to said destination.

When a bulk powder is being loaded into a container, there is a tendency for the product to "fluff up", increasing the settling time of the powder within the container. This has the result of either lengthening the time for loading the container fully with powder or, more likely in practice, reducing the amount of powder loaded into the container within the allowed loading time, perhaps of the order of half an hour.

Accordingly, in one embodiment of a method of the present invention air is extracted from the container during the powder loading operation. This allows the container to be loaded with powder up to its full settled density and can make, for instance, 10% difference to the amount of powder loaded into the container within a given time.

More preferably, air is extracted from below the membrane thereby drawing entrapped air from the powder and through the membrane to increase the bulk of density of the powder.

BRIEF DESCRIPTION OF THE DRAWINGS

The present invention will now be further described by way of example and by reference to the accompanying drawings, in which.

DESCRIPTION OF THE INVENTION

Figure 3:
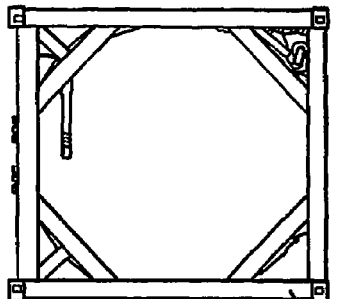
FIG. 3 is an end view of the tank of FIG. 1.
Figure 1:
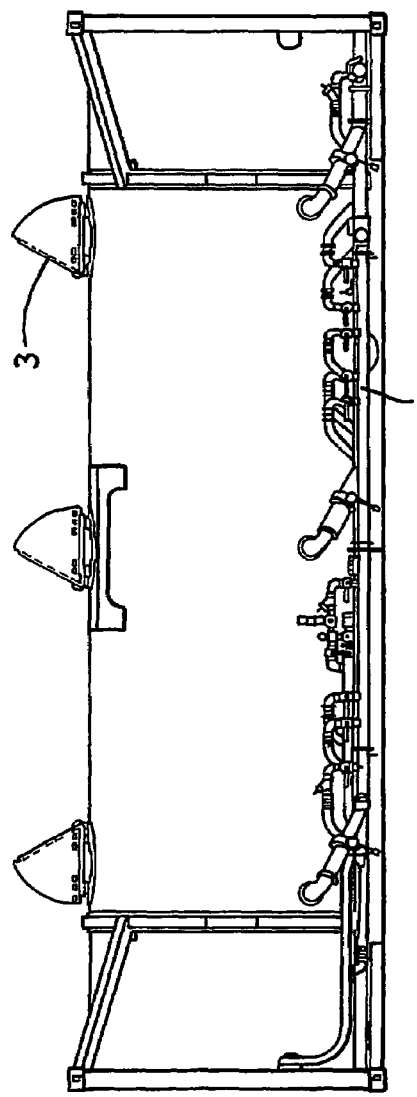
FIG. 1 shows the external view of a standard 30 ft. ISO container-sized bulk powder tank.
Figure 2:
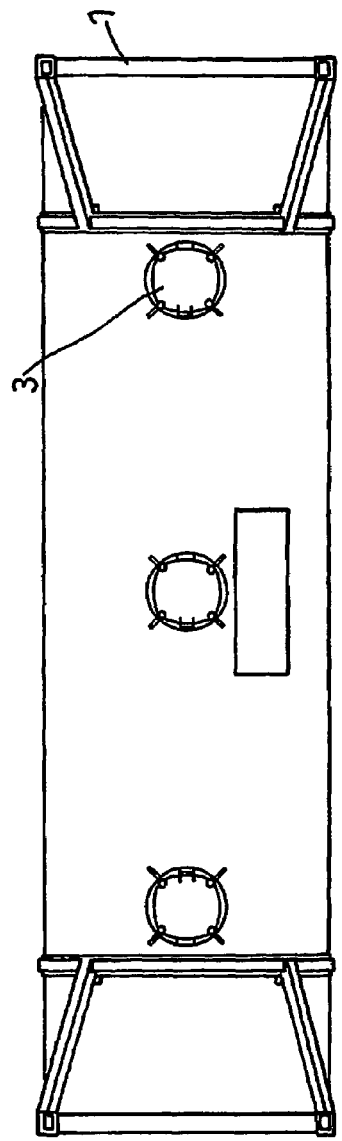
FIG. 2 is a plan view of the tank of FIG. 1.

Referring to the accompanying drawings, FIGS. 1 to 3 show a standard 30 ft. ISO container-sized bulk powder tank. In other embodiments, the tank may be of a different size, for instance, 10 ft. or 40 ft. Shown in these figures are the tank support frame 1, inlets 3 for loading bulk powder into the tank and pipework 5 for fluidising the bulk material and for discharging bulk material to position exterior of the tank.

Figure 4:
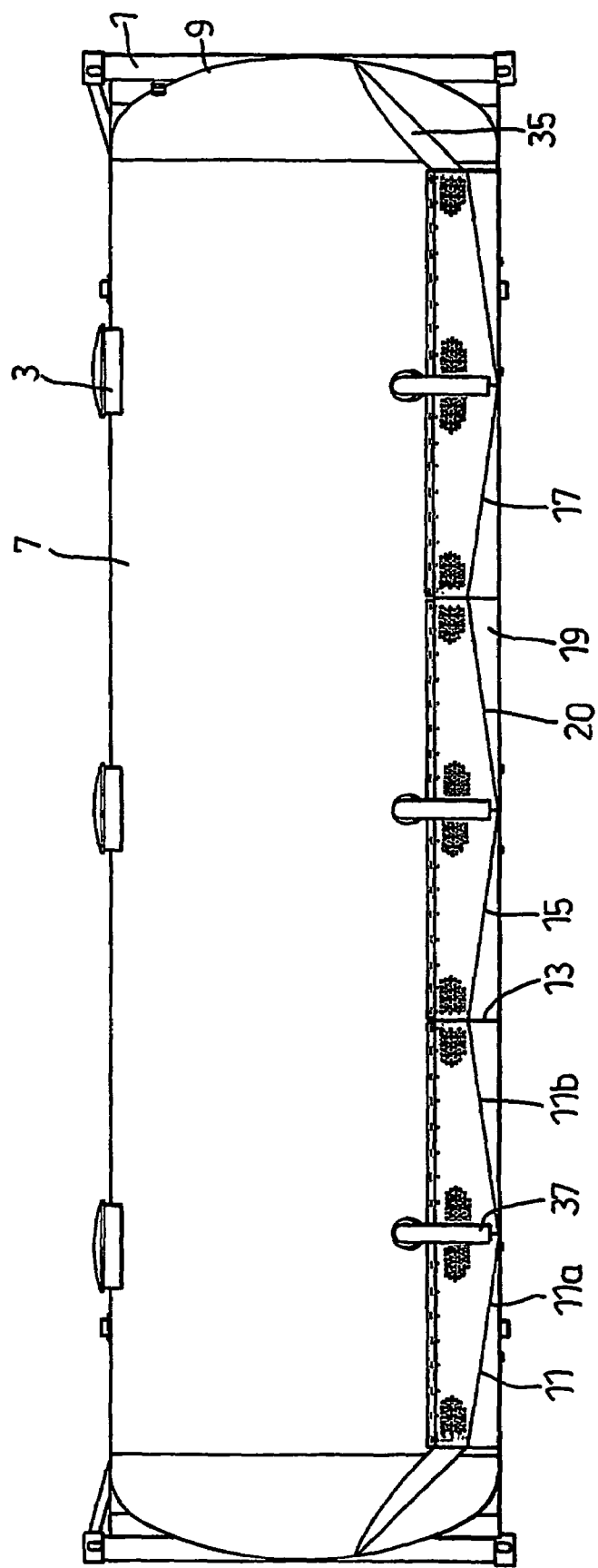
FIG. 4 shows the internal arrangement of the tank of FIG. 1.

Referring to FIG. 4 of the accompanying drawings, tank 7 is a cylindrical shell having dished ends 9, a shape which is suitable for a pressure vessel. Arranged along the base of the tank are a series of membranes 11 each of which is arranged on a support (to be described below). Each membrane 11 comprises two sloping sections 11a and 11b. Section 11a slopes downwardly along a part of the length of the tank from its highest point adjacent one end of the tank to its lowest point at the very base of the tank. Section 11b slopes in the opposite direction from the common lowest point towards a highest point where it is connected to a divider plate 13. Extending from plate 13 in a direction away from membrane 11 are two further membranes 15 and 17. As seen in FIG. 4, the result is effectively a continuous membrane extending from adjacent one end of tank 7 to adjacent the other end. Each plate 13 creates a plenum chamber 19 beneath the membrane 17 so that fluidising air may be fed thereto and thence through the membrane as will be described below.

The angle of inclination 20 between each membrane and the bottom of the container is between 10° and 15°.

Figure 9:
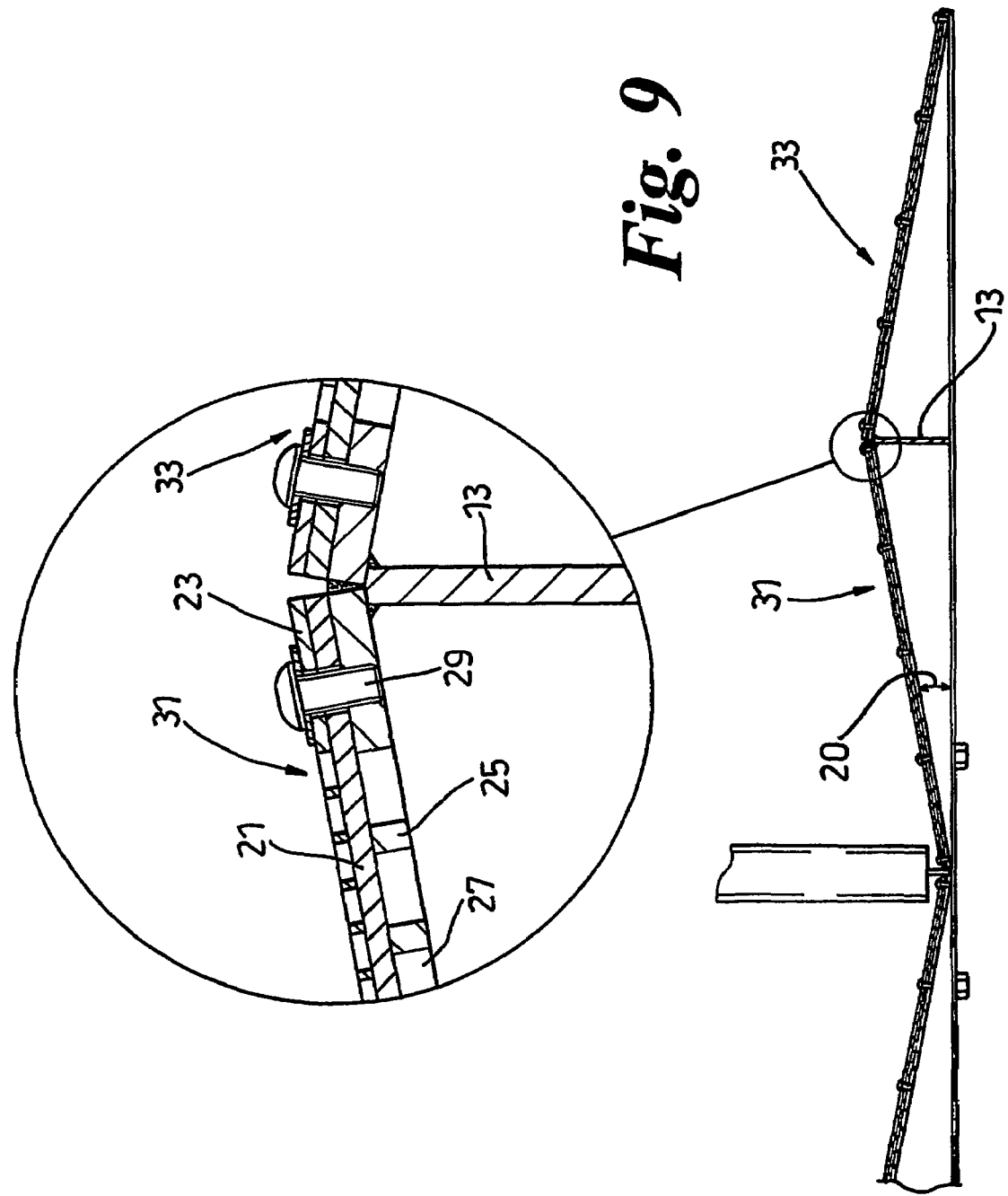
FIG. 9 is a section through one of the membrane supports of the tank of FIG. 1 and includes a more detailed section thereof.

Referring to FIG. 9 of the accompanying drawings, the membrane 21 is made from woven fabric and is provided with a membrane top sheet 23 which is made from perforated metal sheet and prevents the fabric from "lifting" when air is flowing through it into the bulk powder. In the case where the membrane is made of another material, for instance porous metal sheet or porous plastic sheet, the top sheet 23 may be omitted.

The membrane 21, and accompanying top sheet 23, are located on a membrane support 25 which is constructed from a curved, foraminous plate having many punched holes 27 therethrough. The whole assembly is bolted together around its edges with bolts 29. The detailed cross-section in FIG. 9 shows two membrane assemblies 31 and 33 being welded together and each to a support 13.

Figure 5:
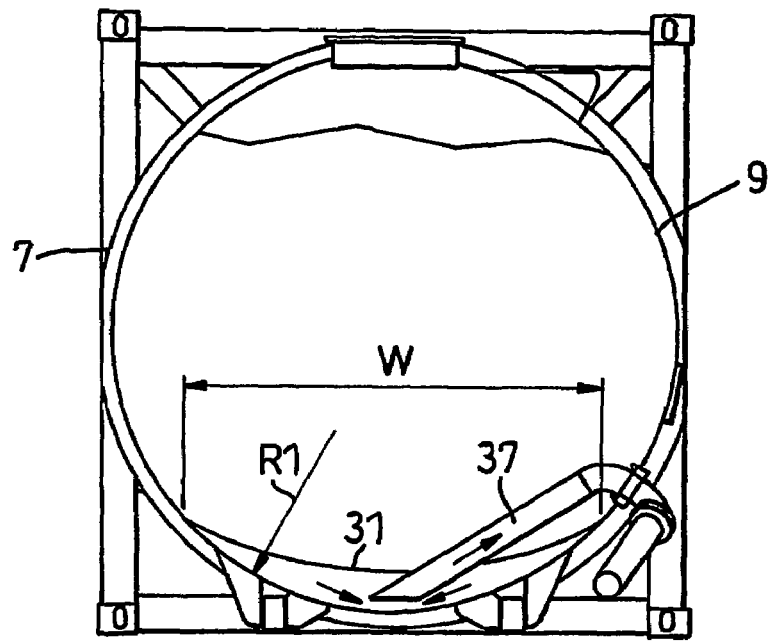
FIG. 5 shows a cross section of the tank at one of the discharge pipe positions.
Figure 6:
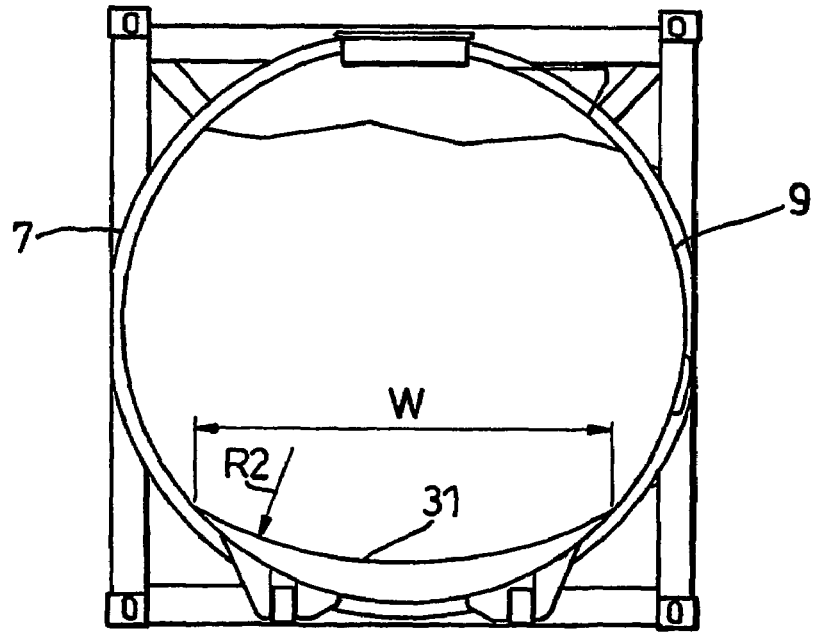
FIG. 6 shows a cross-section of the tank at the apex of the joint between two adjacent membrane supports.

Referring to FIGS. 5 and 6 of the accompanying drawings, a membrane assembly 31 has a constant width W as measured horizontally across the tank 7. As a result the membrane assembly has a smoothly changing radius along its length. The radius changes from value R1 at the point where the membrane support is fixed directly to the tank wall at its lowest point and R2 of the apex between two adjacent membrane assemblies. This changing radius along the length of the membrane provides the required slope for gravity flow of the fluidised powder towards a discharge point. The membrane assembly is connected to the sides of the tank by, for example, welding.

The smooth, curved shape of the membrane assemblies enables heavy loads to be carried by a relatively lightweight support. The support requires no additional strengthening, support ribs or frames, since the metal support is in "tension", supported only at its edges. At each end of the tank 7 there is a sloping transition plate 35 (FIG. 4) which extends between the end of the membrane assembly 11, 17 and a dished end 9. Support plate 35 is sloped at an angle such that material will slide by gravity onto the membrane 11 or 17. Plate 35 is typically arranged at an angle of about 45° from the horizontal.

Figure 7:
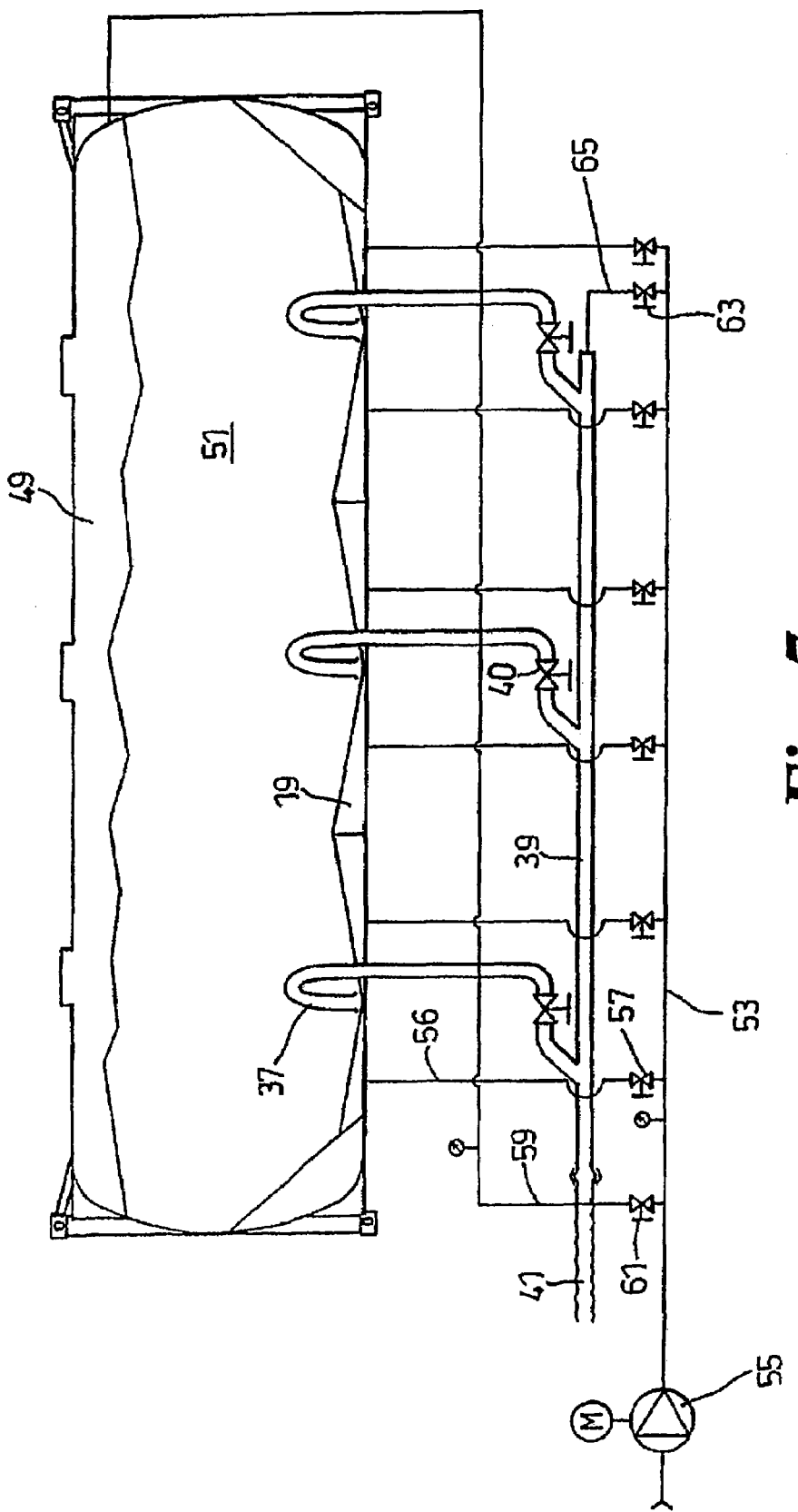
FIG. 7 is a schematic arrangement of the tank of FIG. 1 with compressed air pipework and powder conveying pipework.
Figure 8:
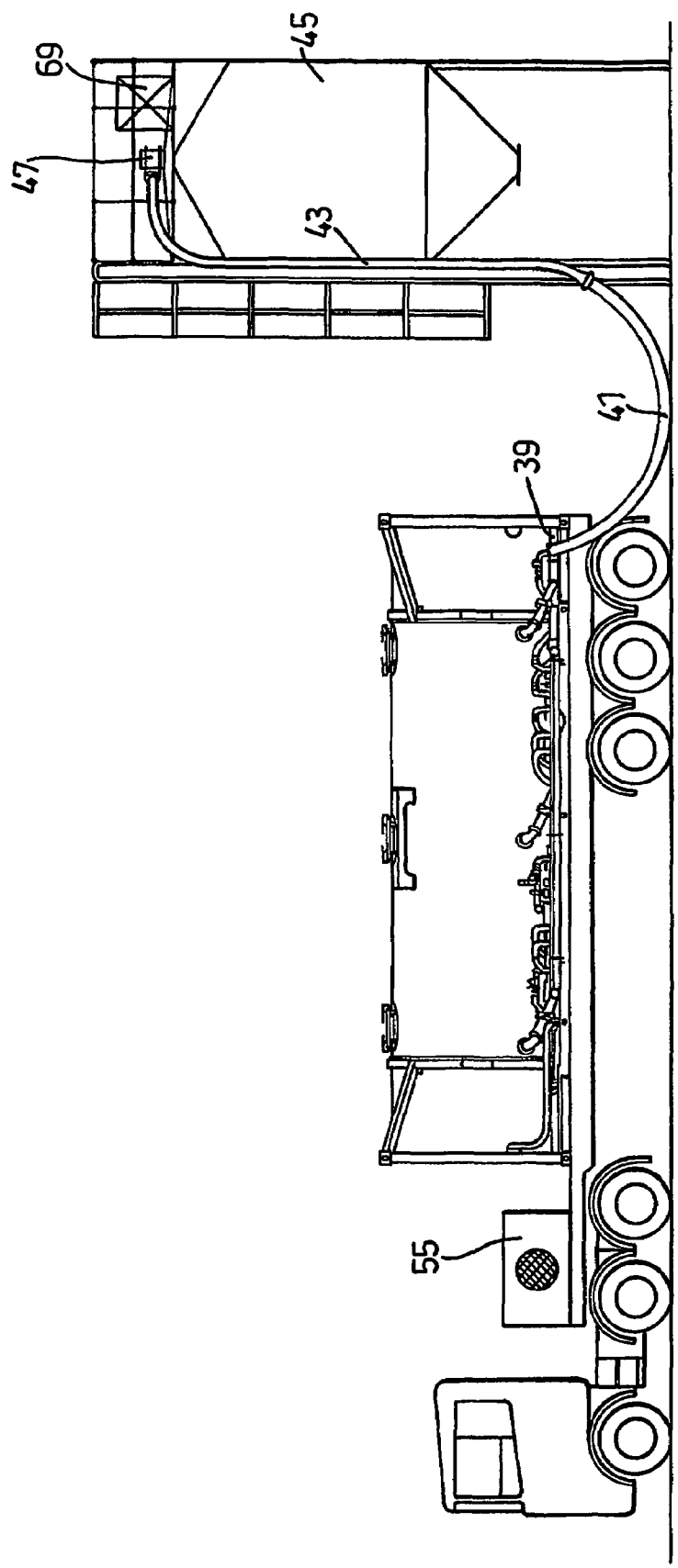
FIG. 8 is a schematic arrangement of the tank, located on a conveying vehicle and connected to a compressed air supply and reception silo.

At the lowest position of each membrane assembly, a discharge pipe 37 opens at a position just above the membrane. Discharge pipe 37 extends upwardly and towards the wall of the container through which it passes as shown in FIG. 5. As best seen in FIG. 7 discharge pipe 37 forms part of a discharge assembly which includes three such pipes 37 connected to a common pipe 39, valves 40 being provided in each discharge pipe 37. As illustrated in FIG. 8, common pipe 39 can, for discharging purposes, be connected to a hose 41 which leads to a pipe 43 extending to the top of a silo 45 to which it is connected by inlet 47. Compressed air from blower 55 applies pressure to the tank 51. This pressure pushes the bulk powder up discharge pipes 37 so that it can be conveyed by pipe 41 to the silo 45.

Air under pressure is supplied to plenum chambers 19 and to the space 49 above bulk powder 51 (see FIG. 7) by a network of pipes shown in single line in FIG. 7. Compressed air is supplied via a common pipe 53 having a compressed air supply or blower 55. Pipe 53 is connected to a plurality of hose 56 each leading to a plenum chamber 19. Each such pipe 56 is provided with a valve 57. In addition pipe 59 extends from pipe 53 to space 49 and is provided with a valve 61. Valve 63 is located in pipe 65 extending between common pipe 39 and pipe 53.

The bulk powder tank 7 is filled with bulk powder by gravity through inlets 3. The tank is then moved by road, rail or sea to its destination, at which the bulk powder is to be pneumatically conveyed into the receiving silo 45.

In order to empty the tank of bulk powder the blower 55 is connected to the air supply header pipe 53 and a discharge hose 41 is connected to the discharge header pipe 39. The compressed air valves 57 and 61 are then opened to raise the pressure of the tank to approximately 1.8 bar pressure for opening the conveying outlet valves 40 in sequence to empty the tank. During emptying, valve 63 is opened to add air to the powder in order to create the correct powder and air mixture for pneumatic conveying. When all material has been discharged, the blower 55 is stopped and the tank is allowed to return to atmospheric pressure by venting through the empty conveyor pipe 43 into the silo 45. The conveying air and venting air is passed through a filter 69 so that the air venting to atmosphere is clean.

During loading of bulk powder into the container air may be extracted from the container thereby allowing the container to be filled with powder to its full density within a reasonable filling time, perhaps of the order of half an hour. This can be achieved by applying suction to the space below the membrane by means of a vacuum source, for instance replacing the compressed air supply or blower 55 in the arrangement shown in FIG. 7.

The invention claimed is:

1. An elongate container for the transport of bulk powders, the bottom of the container being provided with a longitudinally sloping membrane support extending along at least a portion of the length of the container, a gas-permeable membrane mounted on said support, said support being unsupported relative to the container between longitudinal and transverse ends of the support wherein the membrane is curved in a direction transverse to the length of the container, the extent of curvature changing along the length of the membrane.

2. A container according to claim 1, wherein the curvature of the membrane increases in a direction from a lowest point to a highest point of the membrane.

3. A container according to claim 1, wherein a plurality of membranes are arranged along the base of the container in lengthwise juxtaposition.

4. A container according to claim 3, wherein adjacent membranes slope in opposite directions along the length of the container.

5. A container according to claim 1, wherein a container, at least when arranged for unloading of bulk powder therefrom, is provided with a discharge pipe, one end of which is located adjacent the lowest point of the or each membrane.

6. A container according to claim 5, wherein the discharge pipe is connected to means, located outside the container, for pneumatically conveying powder from the container to a position exterior thereof.

7. A container according to claim 1, wherein the or each membrane is inclined at an angle of from 10° to 15° relative to the bottom of the container.

8. A container according to claim 1, wherein means are provided, at least when the container is to be unloaded, to cause powder located above the membrane to be fluidised.

9. A container according to claim 8, wherein the fluidising means includes means for delivering gas under pressure to the space below the sloping membrane.

10. A container according to claim 1, wherein the membrane is made of woven fabric, porous metal sheet or porous plastic sheet.

11. A container according to claim 1, wherein the container is cylindrical.

12. A container according to claim 11, wherein the container is a pressure vessel located within a standard ISO Tank Container dimensioned frame.

13. A method of conveying bulk powder to a destination therefor including the steps of:
    loading the bulk powder into a container in which the bottom of the container is provided with a longitudinally sloping membrane support extending along at least a portion of the length of the container and a gas-permeable membrane mounted on said support and curved in a direction transverse to the length of the container, the extent of curvature changing along the length of the membrane;
    transporting the container to a location in the vicinity of said destination;
    feeding gas under pressure to a position between the membrane and the bottom of the container so as to fluidise the bulk powder within the container; and
    pneumatically conveying said fluidised bulk powder from the container to said destination.

14. A method according to claim 13, wherein, during the loading of the bulk powder into the container, air is extracted therefrom.

15. A method according to claim 14, wherein air is extracted from below the membrane, thereby drawing entrapped air from the powder and through the membrane to increase the bulk density of the powder.

16. A method according to claim 13 including providing said support being unsupported relative to the container between longitudinal and transverse ends of the support.

17. An elongate container for the transport of bulk powders, the bottom of the container being provided with a longitudinally sloping membrane support extending along at least a portion of the length of the container, a gas-permeable membrane mounted on said support, and wherein the membrane is curved in a direction transverse to the length of the container, the extent of curvature changing along the length of the membrane.

18. A container according to claim 17 wherein the membrane support is in the form of a foraminous curved plate.

\* \* \* \* \*